United States Patent Office 2,938,921
Patented May 31, 1960

2,938,921

N-[β-(3,4-DICHLOROPHENYL)-β-HYDROXYETHYL] ISOPROPYLAMINE AND SALTS

Jack Mills, Glenns Valley, Ind., assignor to Eli Lilly and Company, Indianapolis, Ind., a corporation of Indiana No Drawing. Filed Mar. 17, 1958, Ser. No. 721,641

3 Claims. (Cl. 260—570.6)

This invention relates to novel chemical compounds and more particularly to a novel phenyl-substituted isopropylamine base and to its salts.

The novel amine base provided by this invention is N - [β - (3,4 - dichlorophenyl) - β - hydroxyethyl] - isopropylamine which is represented by the following formula:

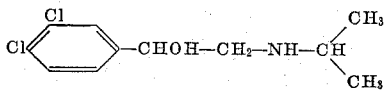

Also included within this invention are the acid addition salts of the above base. A preferred group of acid addition salts are those which are formed from nontoxic, pharmaceutically-acceptable acids and includes salts prepared from nontoxic inorganic acids such as hydrochloric, sulfuric, and phosphoric acid, and like acids, and nontoxic organic acids such as tartaric, maleic, succinic, benzoic, and like acids.

The amine base of this invention can be prepared as follows: 3,4-dichloroacetophenone is brominated, and the resulting ω-bromo ketone is hydrogenated to give 3,4-dichlorostyrene bromohydrin which upon reaction with isopropylamine yields N - [β - (3,4 - dichlorophenyl)-β - hydroxyethyl] - isopropylamine.

The acid addition salts of the amine base can be prepared by methods well known to the art. For example, the hydrobromide and hydrochloride salts can be prepared by saturating an ethanolic or ethereal solution of the amine base with gaseous hydrogen bromide or hydrogen chloride. The amine salt is then isolated in any suitable manner as by filtration or evaporation. Alternatively, solutions containing equivalent amounts of the free base and the desired acid can be mixed and the base isolated as specified above.

N - [β - (3,4 - dichlorophenyl) - β - hydroxyethyl]-isopropylamine and its salts have the property of reversing the depressor effects of epinephrine by a competitive inhibition mechanism, and so are useful in blocking a variety of arrhythmias in mammals produced by epinephrine and epinephrine-like substances. In use, the compounds can be administered parenterally or orally in any of the customary dosage forms such as solutions, compressed tablets, filled capsules, and the like.

This invention is further illustrated by the following specific example.

*Preparation of N-[β-(3,4-dichlorophenyl)-β-hydroxyethyl]-isopropylamine*

621 g. of 3,4-dichloroacetophenone prepared by the method of Walter and Hauser described in J. Am. Chem. Soc., 68, 1386 (1946), were dissolved in 4000 ml. of anhydrous ether to which had been added about 5 g. of dibenzoyl peroxide as a bromination catalyst. To the solution were added 540 g. of bromine in dropwise fashion over a period of about 2 hours. After all the bromine had been added, the reaction mixture was poured over about 4 kg. of ice. The ether layer was separated, was washed sequentially with about 2 l. of water, 1 l. of a saturated sodium bicarbonate solution and 2 l. of water. The washed ether layer was separated, was dried, and the ether was removed therefrom in vacuo. The resulting residue comprising ω-bromo-3,4-dichloroacetophenone formed in the above reaction, weighed about 865 g. The ω-bromoacetophenone was dissolved in 1000 ml. of anhydrous methanol and the solution was cooled to about 15° C. A solution containing 175 g. of sodium borohydride in 1200 ml. of anhydrous methanol was added to the above solution, thus reducing the keto group of the acetophenone to a hydroxy group. During the addition, the reaction temperature was maintained in the range 15–25° C. After the addition had been completed, the reaction mixture was stirred for one additional hour, after which time the methanol was removed in vacuo. The resulting residue containing 3,4-dichlorostyrene bromohydrin formed in the above reaction was poured into a mixture of about 500 ml. of 12 N hydrochloric acid and 2.5 kg. of ice. The bromohydrin was removed from the mixture by extraction with three successive 1 l. portions of ether. The ether extracts were combined, and the combined extracts were washed with 1 l. of water. The ether layer was separated, and was dried and the ether was removed by evaporation in vacuo, leaving 3,4-dichlorostyrene bromohydrin as a residue.

700 g. of 3,4-dichlorostyrene bromohydrin thus prepared were diluted with about 600 ml. of anhydrous ethanol and the mixture was cooled to about 0° C. A solution of 460 g. of anhydrous isopropylamine in 200 ml. of anhydrous ethanol was added to the bromohydrin solution. After the addition had been completed, the reaction mixture was heated cautiously until the initial vigorous heat-induced reaction had subsided. The reaction mixture was then heated at refluxing temperature for about 16 hours, after which time it was cooled and the ethanol was removed by evaporation in vacuo, leaving a residue which was diluted with about 360 ml. of 12 N hydrochloric acid. The acidic aqueous layer containing the amine salts was extracted three times with about 500 ml. portions of ether, and the extracts were discarded. The acidic aqueous layer was made basic with about 500 ml. of 50 percent (w./v.) sodium hydroxide, thus converting the amine salts to their free bases. The free amine bases were extracted into about 1000 ml. of ether, the ether extract was separated and was dried, and the ether and any remaining isopropylamine was removed by evaporation in vacuo. The residue, consisting of N-[β-(3,4-dichlorophenyl)-β-hydroxyethyl]-isopropylamine, was a heavy viscous oil. It distilled in the range of 125–135° C. at a pressure of 0.01 mm. of mercury.

The amine base was converted to its hydrochloride salt as follows: The base was dissolved in about 500 ml. of ether, and anhydrous HCl gas was passed into the ethereal solution, thus converting the amine to its hydrochloride salt. The ether-insoluble hydrochloride salt was isolated by filtration and was recrystallized twice from anhydrous ethanol. N-[β-(3,4-dichlorophenyl)-β-hydroxyethyl]-isopropylamine hydrochloride thus purified melted at about 153–154° C.

*Analysis.*—Calculated: C, 46.41; H, 5.66; N, 4.92. Found: C, 46.87; H, 5.78; N, 4.72.

I claim:

1. A compound selected from the group consisting of N - [β - (3,4 - dichlorophenyl) - β - hydroxyethyl] - isopropylamine and its pharmaceutically-acceptable, nontoxic acid addition salts.

2. N - [β - (3,4 - dichlorophenyl) - β - hydroxyethyl]-isopropylamine hydrochloride.

3. N-[β-(3,4-dichlorophenyl)-β-hydroxyethyl]-isopropylamine.

References Cited in the file of this patent

UNITED STATES PATENTS

| | | |
|---|---|---|
| 2,308,232 | Scheuing et al. | Jan. 12, 1943 |
| 2,695,919 | Wright et al. | Nov. 30, 1954 |
| 2,816,059 | Mills | Dec. 10, 1957 |

OTHER REFERENCES

Glynn et al.: Chemical Abstracts, vol. 27, page 1355 (1933).